(12) United States Patent
Zhou et al.

(10) Patent No.: US 12,072,929 B2
(45) Date of Patent: Aug. 27, 2024

(54) SONG RECOMMENDATION METHOD AND APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventors: Zhixin Zhou, Beijing (CN); Jian Zhu, Beijing (CN); Wangwen Wu, Beijing (CN); Jiarui Xu, Beijing (CN); Weiming Zheng, Beijing (CN); Bilei Zhu, Beijing (CN); Peiwen Guan, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/600,323

(22) PCT Filed: Jul. 1, 2021

(86) PCT No.: PCT/CN2021/104110
§ 371 (c)(1),
(2) Date: Sep. 30, 2021

(87) PCT Pub. No.: WO2022/160603
PCT Pub. Date: Aug. 4, 2022

(65) Prior Publication Data
US 2024/0054157 A1 Feb. 15, 2024

(30) Foreign Application Priority Data
Jan. 28, 2021 (CN) .......................... 202110117713.6

(51) Int. Cl.
*G06F 16/635* (2019.01)
*G06F 16/638* (2019.01)

(52) U.S. Cl.
CPC .......... *G06F 16/635* (2019.01); *G06F 16/639* (2019.01)

(58) Field of Classification Search
CPC .... G06F 16/635; G06F 16/638; G06F 16/639; G06F 16/686; G06F 16/683;
(Continued)

(56) References Cited

U.S. PATENT DOCUMENTS

| | | | |
|---|---|---|---|
| 2009/0063459 A1 | 3/2009 | Acharya | |
| 2012/0185488 A1* | 7/2012 | Oppenheimer | ......... G06F 16/68 707/E17.101 |

(Continued)

FOREIGN PATENT DOCUMENTS

| | | |
|---|---|---|
| CN | 102402625 A | 4/2012 |
| CN | 102902759 A | 1/2013 |

(Continued)

OTHER PUBLICATIONS

First Office Action issued Nov. 15, 2022 in Chinese Patent Application No. 202110117713.6, with partial English translation (12 pages).

(Continued)

*Primary Examiner* — Yogeshkumar Patel (57) ABSTRACT

According to a song recommendation method and apparatus, an electronic device, a storage medium, a computer program product and a computer program provided in embodiments of the present disclosure, a first page can be displayed firstly, and the first page includes a target song selected according to a song release date; then, in response to a trigger operation performed for the target song on the first page, the first page is switched to a second page of the selected target song. The song release date of the target song in the present embodiment is determined according to release information and auditory perception information of a song, and in this way, (Continued)

a real song release date of a song can be effectively identified, which in turn enables the target song shown on the first page to be selected based on the real song release date thereof.

20 Claims, 5 Drawing Sheets

(58) Field of Classification Search
CPC .. G06F 16/489; G06F 16/433; G06F 16/9538; G06F 16/958
USPC .......................................................... 700/94
See application file for complete search history.

(56) References Cited

U.S. PATENT DOCUMENTS

| | | | |
|---|---|---|---|
| 2013/0219274 A1* | 8/2013 | Svendsen | H04N 21/4788 715/716 |
| 2014/0040740 A1* | 2/2014 | Asano | G06F 3/04817 715/716 |
| 2014/0143212 A1* | 5/2014 | Shumay | G06F 16/437 707/E17.044 |
| 2015/0074090 A1* | 3/2015 | Farrelly | G06F 16/435 707/769 |
| 2017/0193100 A1* | 7/2017 | Bowery | G06F 16/638 |
| 2018/0349493 A1 | 12/2018 | Zhao | |
| 2022/0321936 A1* | 10/2022 | He | H04N 21/8113 |

FOREIGN PATENT DOCUMENTS

| | | |
|---|---|---|
| CN | 108334623 A | 7/2018 |
| CN | 108428441 A | 8/2018 |
| CN | 109376265 A | 2/2019 |
| CN | 109857900 A | 6/2019 |
| CN | 111858974 A | 10/2020 |
| CN | 112765396 A | 5/2021 |

OTHER PUBLICATIONS

International Patent Application No. PCT/CN2021/104110, International Search Report mailed Oct. 26, 2021, 12 pages.

* cited by examiner

SONG RECOMMENDATION METHOD AND APPARATUS, ELECTRONIC DEVICE, AND STORAGE MEDIUM

CROSS-REFERENCE TO RELATED APPLICATION

The present application claims priority to Chinese Patent Application No. 202110117713.6, titled "SONG RECOMMENDATION METHOD AND APPARATUS, ELECTRONIC DEVICE, AND STORAGE MEDIUM", filed on Jan. 28, 2021, which is hereby incorporated by reference in its entirety.

TECHNICAL FIELD

Embodiments of the present disclosure relate to the field of computer and, in particular, to a song recommendation method and apparatus, an electronic device, a storage medium, a computer program product and a computer program.

BACKGROUND

With the popularity of the Internet, many newly released songs flood into music platforms including music applications (Application, APP) or the like every day. In order to facilitate users to quickly obtain these new songs, a music platform selects newly released songs from a music library and generates a recommendation list of new songs or a recommendation ranking list of new songs for users to listen to.

In the prior art, whether a song belongs to a new song or not is determined based on its release date, and the release date of a song is determined according to the release date of the album to which the song belongs. However, for such way of new song identification, some "oldies" released in a new collection may be mistakenly identified as "new songs", so that there may be occurrence of "oldies" in a pushed recommendation ranking list of new songs, which is not conducive for users to use.

SUMMARY

In view of the problem above, embodiments of the present disclosure provide a song recommendation method and apparatus, an electronic device, a storage medium, a computer program product and a computer program.

In a first aspect, the present disclosure provides a song recommendation method, including:
  displaying a first page, where the first page includes a target song selected according to a song release date; and
  in response to a trigger operation performed for the target song on the first page, switching the first page to a second page of the selected target song;
  where the song release date of the target song is determined according to song release information and auditory perception information of a song.

In a second aspect, the present disclosure provides a song recommendation apparatus, including:
  a display module, configured to display a first page, where the first page includes a target song selected according to a song release date; and
  an interaction module, configured to switch, in response to a trigger operation performed for the target song on the first page, the first page to a second page of the selected target song;
  where the song release date of the target song is determined according to song release information and auditory perception information of a song.

In a third aspect, the present disclosure provides an electronic device, where the electronic device includes:
  at least one processor; and
  a memory;
  where the memory stores computer execution instructions; and
  the at least one processor executes the computer execution instructions stored in the memory to enable the at least one processor to execute the song recommendation method according to the first aspect.

In a fourth aspect, the present disclosure provides a computer readable storage medium having, stored therein, computer execution instructions which, when executed by a processor, implement the song recommendation method according to the first aspect.

In a fifth aspect, the present disclosure provides a computer program product including computer instructions which, when executed by a processor, implement the song recommendation method according to the first aspect.

In a six aspect, the present disclosure provides a computer program which, when executed by a processor, implements the song recommendation method according to the first aspect.

According to the song recommendation method and apparatus, the electronic device, the storage medium, the computer program product and the computer program provided in embodiments of the present disclosure, a first page can be displayed firstly, and the first page includes a target song selected according to a song release date; then the first page is switched to a second page of the selected target song in response to a trigger operation performed for the target song on the first page. The song release date of the target song in the present embodiment is determined according to song release information and auditory perception information of a song, and in this way, a real song release date of a song can be effectively identified, which in turn causes the target song shown on the first page to be selected based on the real song release date thereof. The identification accuracy of a new song can be improved effectively in the way, which is convenient for users to use.

BRIEF DESCRIPTION OF THE DRAWINGS

To illustrate the technical solutions in embodiments of the present disclosure or in the prior art more clearly, the following briefly introduces the accompany drawings needed for describing the embodiments or the prior art. Apparently, the accompanying drawings in the following description are intended for some embodiments of the present disclosure, and for those of ordinary skill in the art, they may still obtain other drawings according to these accompanying drawings without creative effort.

DESCRIPTION OF EMBODIMENTS

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part of rather than all embodiments of the present disclosure. All other embodiments obtained by those of ordinary skill in the art based on embodiments of the present disclosure without creative effort shall fall within the protection scope of the present disclosure.

With the popularity of the Internet, many newly released songs flood into music platforms including music APPs or the like every day. In order to facilitate users to quickly obtain these new songs, a music platform selects newly released songs from a music library and generates a recommendation list of new songs or a recommendation ranking list of new song for users to listen to.

In the prior art, whether a song belongs to a new song or not is determined based on its release date, and the release date of a song is determined according to the release date of an album to which the song belongs. However, for such way of new song identification, some "oldies" released in a new collection may be mistakenly identified as "new songs".

For example, in 2000, a singer releases album A, which includes song a; and in 2020, the singer releases album B, which has collected therein classic songs for 20 years. Song a which was released in 2000 is collected in album B. In view of the case described in this example, based on existing methods for identifying the release date of a new song, a music platform may identify song a in album B as a new song released in 2020, and put it into a recommendation list of new songs for recommendation.

The accuracy rate of such new song recommendation is not high, that is, the song determined by the music platform as a new song is actually an oldie, which greatly affects audio-visual experience of users.

In view of such problem, according to embodiments of the present disclosure, a song release date can be determined according to song release information and auditory perception information of a song, that is, a series of determinations and processing is performed through the release information and the auditory perception information of the song to determine the actual release date of the song, and the actual release date of the song is used for playing and recommending the song.

In particular, recommendation of a new song achieved based on a way provided in an embodiment of the present disclosure will not result in a case where an "oldie" in a newly released album is identified as a "new song", which is convenient for users to use.

Figure 1:
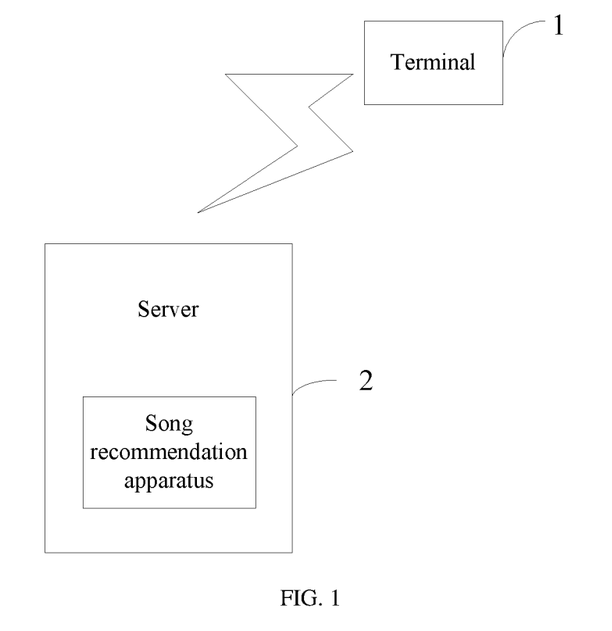
FIG. 1 is a schematic diagram of a network architecture on which the present disclosure is based.

Referring to FIG. 1, FIG. 1 is a schematic diagram of a network architecture on which the present disclosure is based. The network architecture shown in FIG. 1 can specifically include a terminal 1 and a server 2.

The terminal 1 can specifically be a hardware device that can be used to play a song, such as a user's mobile phone, a desktop computer, a smart home device, a tablet computer and the like. The terminal 1 can be installed with a music platform of songs, such as a playing APP and a listening client. The server 2 can be an independent server or a server cluster provided in the cloud, which can be used to provide files and data support to the music platform of songs on the terminal 1, as well as display services and interaction services of a page.

A song recommendation apparatus provided in the present disclosure can be specifically carried in the server 2 shown in FIG. 1, which recommends a song stored in the server 2 based on a song release date on the basis of a song recommendation method provided in the present disclosure.

Figure 2:
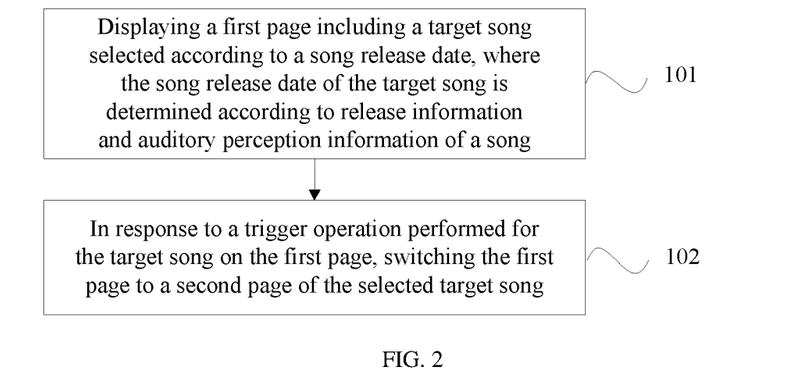
FIG. 2 is a schematic diagram of procedures of a song recommendation method according to an embodiment of the present disclosure.

The network architecture based on the above description is aimed at the aforementioned problem in the prior art that a push is inaccurate for a song, especially for a new song, due to direct use of a release date of an album to which the song belongs as a release date of the song. In a first aspect, referring to FIG. 2, FIG. 2 is a schematic diagram of procedures of a song recommendation method according to an embodiment of the present disclosure. The song recommendation method provided in the embodiment of the present disclosure, including: Step 101, displaying a first page including a target song selected according to a song release date, where the song release date of the target song is determined according to song release information and auditory perception information of a song; and Step 102, in response to a trigger operation performed for the target song on the first page, switching the first page to a second page of the selected target song.

It should be noted that an execution entity of the recommendation method provided in this example is the aforementioned song recommendation apparatus, in some of embodiments of the present disclosure, the execution entity specifically refers to a client or a display side of a music platform, which is installed or integrated on a terminal and which can be presented to a user by means of an application interface or a control display interface. The user can interact with the song recommendation apparatus through the terminal, and control the apparatus to obtain pages and songs it provides.

On the terminal, since the song recommendation apparatus can specifically be a client of a music platform, it typically provides a user with displaying and playing functions for music. That is to say, the terminal can display thereon a large number of songs, and the user can perform different operations on these songs, such as starting playing, pausing playing and switching, through different touch control manners such as clicking, sliding, and pressing.

In an implementation on which the present disclosure is based, the terminal will display a first page, a target song will be included on the first page, and the target song is selected through a song release date. Different from the prior art, in this implementation, the song release date is determined according to song release information and auditory perception information of a song.

Subsequently, the terminal will switch to a second page of the selected target song from the first page in response to a trigger operation performed for the target song on the first page. The touch control for the trigger operation can be clicking, sliding, pressing and so on, which is not limited in this implementation.

The aforementioned first page and the second page are not limited in the present embodiment with regard to their specific forms, and page functions and contents presented on the pages can be determined based on product requirements on an actual music platform.

For ease of understanding, the following uses an example where the target song is a "new song" selected based on a song release date to briefly describe several possible types of page switching.

Scenario 1

Figure 3:
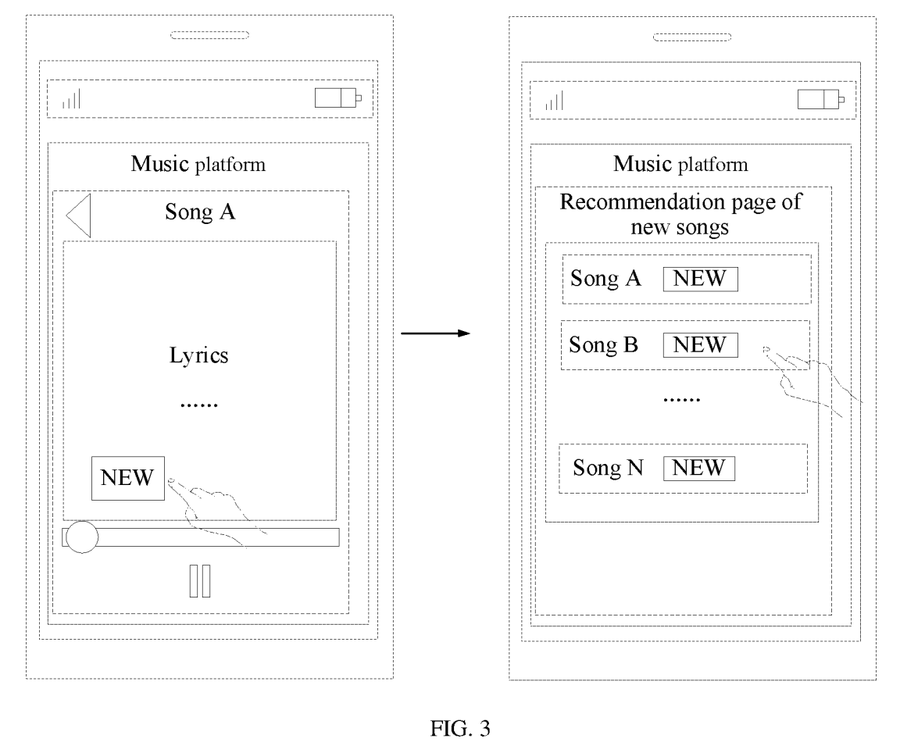
FIG. 3 is a schematic diagram of a first interaction of a song recommendation method according to an embodiment of the present disclosure.

FIG. 3 is a schematic diagram of a first interaction of a song recommendation method according to an embodiment of the present disclosure. As shown in FIG. 3, the terminal is in an operation state where a client of a music platform is used to play a song. At this point, a first page is presented with a playing page of song A: on the playing page, a user can control playing and pausing of the song by triggering a playing/pausing button of the song.

In addition, the playing page also includes thereon a new song identifier indicating that the song A belongs to a new song. In particular, for the song A, it is obtained by means of filtering song release dates of respective songs from a music library, for example, filtering new songs based on song release dates (that is, selecting, from the music library, songs whose release dates are closer to a current date and playing them randomly or in sequence). How to determine the song release date of the song A can refer to subsequent implementations, which will not be described here.

At this point, the user can select the new song identifier on the first page (that is, the playing page of song A), and the terminal will respond to this trigger operation and display other songs whose new song identifiers are the same as the new song identifier of the song A. As shown in FIG. 3, a second page is presented with a recommendation page of new songs. Exemplarily, the recommendation page of new songs includes one or more new songs, respective ones can be obtained through new song filtering based on song release dates, and the song release date of each of the new songs can be determined using a determination method for a song release date in a subsequent implementation.

The interaction scenario shown in FIG. 3 depicts that, using the song recommendation method provided in the present disclosure, the user can select the new song identifier of the song A on the playing page (the first page) of the song A, so that the terminal switches to a recommendation page of new songs corresponding to the song A (the second page), where other songs having new song identifiers that are the same as the new song identifier of the song A will be included on the recommendation page of new songs. The song A and other songs in the recommendation page of new songs as involved in the interaction scenario shown in FIG. 3 are each obtained by means of firstly determining the song release dates of the respective songs based on a method for determining a song release date mentioned in a subsequent way, and then performing new song filtering (i.e., selecting songs whose song release dates are closer to the current date).

Scenario 2

Figure 4:
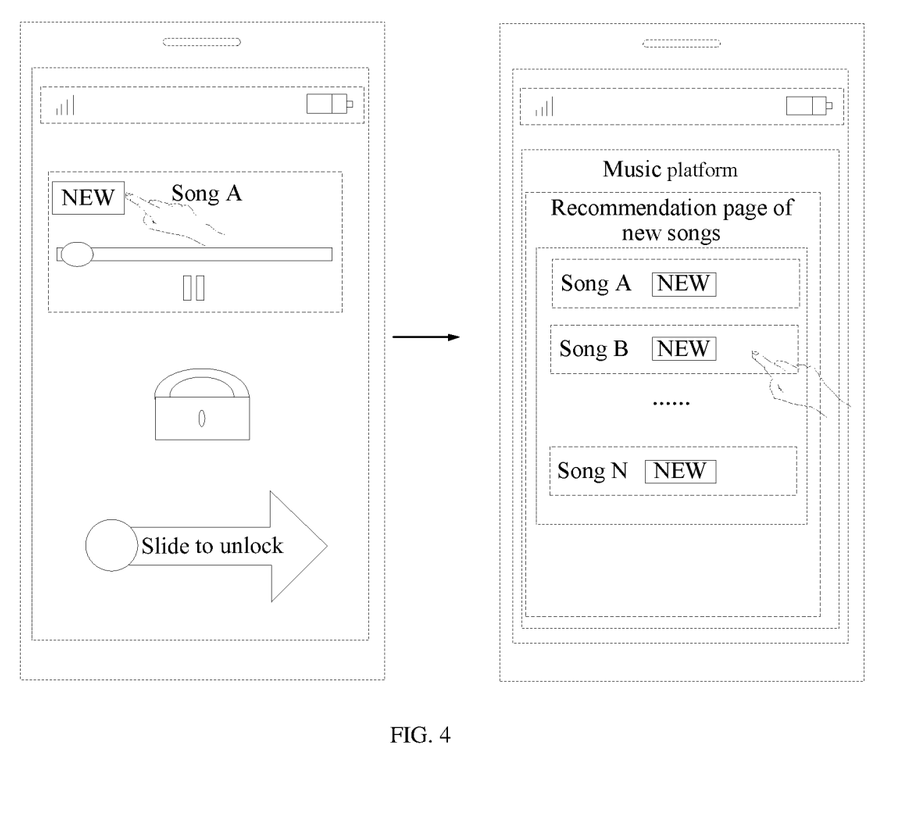
FIG. 4 is a schematic diagram of a second interaction of a song recommendation method according to an embodiment of the present disclosure.

FIG. 4 is a schematic diagram of a second interaction of a song recommendation method according to an embodiment of the present disclosure. As shown in FIG. 4, the terminal is in a screen lock state, but the client of the music platform in the background of the terminal is still operating and provides the user with a playing service. At this point, the screen lock page will serve as the first page mentioned in the present disclosure, on which the song A selected based on the song release date and the corresponding new song identifier are displayed (similar to the method for determining the song A and the corresponding new song identifier mentioned in the scenario 1).

After the user triggers the new song identifier on the screen lock page (the first page), the page will jump from the screen lock page (the first page) of the terminal to a second page. At this point, similar to the foregoing scenario 1, the second page in this scenario 2 can specifically be a recommendation page of new songs, which will include thereon other songs having new song identifiers that are the same as the new song identifier of the song A.

Also, the song A and other songs in the recommendation page of new songs as involved in the interaction scenario shown in FIG. 4 are each obtained by means of firstly determining the song release dates of the respective songs based on a method for determining a song release date mentioned in a subsequent way, and then performing new song filtering (i.e., selecting songs whose song release date are closer to the current date).

Scenario 3

Figure 5:
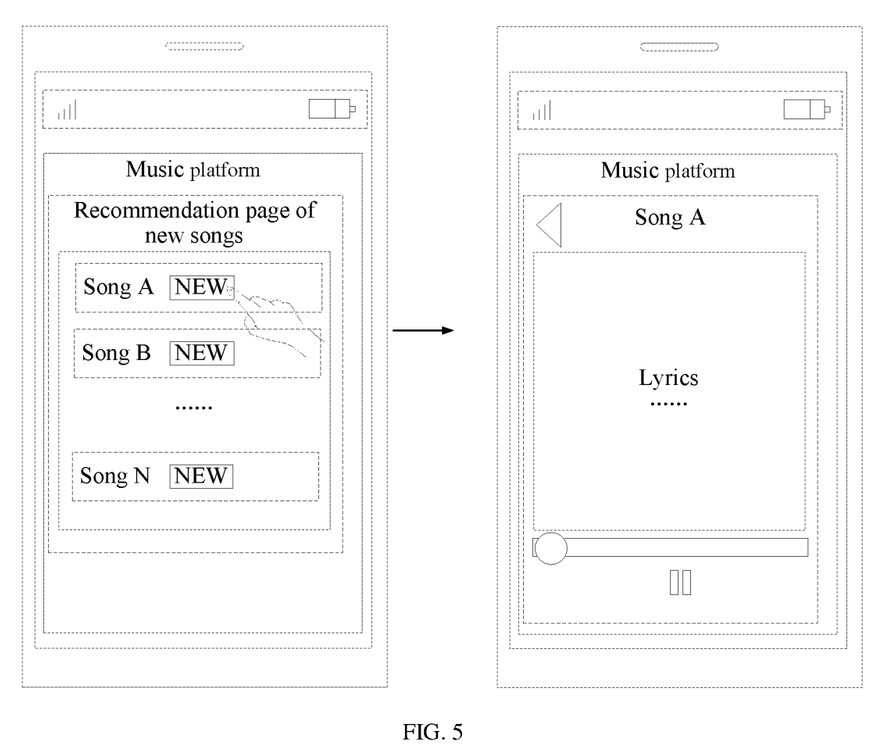
FIG. 5 is a schematic diagram of a third interaction of a song recommendation method according to an embodiment of the present disclosure.

FIG. 5 is a schematic diagram of a third interaction of a song recommendation method according to an embodiment of the present disclosure. As shown in FIG. 5, the terminal is in an operation state where a client of a music platform is used to provide the user with song related information for browsing. At this point, a first page is presented with a recommendation page of new songs including song A: on the recommendation page of new songs, the user can browse songs, singers, and related information provided on the recommendation page of new songs by means of dragging the page.

Certainly, similar to the previous scenario 1 and scenario 2, the recommendation page of new songs includes one or more new songs, respective ones can be obtained through new song filtering based on song release dates, and the song release date of each of the new songs can be determined using a determination method for a song release date in a subsequent implementation.

Subsequently, the terminal will respond to the trigger operation performed by the user for the song A (the target song) on the recommendation page of new songs (the first page). At this point, the terminal will switch from the recommendation page of new songs (the first page) to the song playing page (the second page) of the song A (the target song). Optionally, when the song A is selected and a switch to a corresponding song playing page is performed, playing for the song A can be performed synchronously.

Certainly, it should be noted that the switching between the first page and the second page involved in embodiments of the present disclosure includes, but is not limited to the above three scenarios. According to actual user requirements, there are more switch triggering manners and content representations between the first page and the second page.

On the basis of the above manners, the following will further explain the above-mentioned determination method of the song release date.

Figure 6:
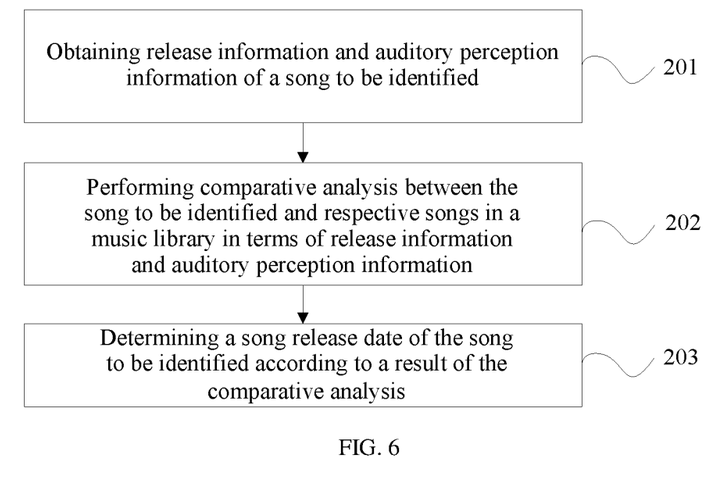
FIG. 6 is a schematic diagram of procedures of a method for determining a song release date according to an embodiment of the present disclosure.

Different from the prior art, this implementation adopts a different method for determining a song release date. FIG. 6 is a schematic diagram of procedures of a method for determining song release date provided in an embodiment of the present disclosure. Before Step 101 shown in FIG. 2, song release dates of respective songs can also be determined firstly. As shown in FIG. 6, the method includes:

Step 201: obtaining release information and auditory perception information of a song to be identified;

Step 202: performing comparative analysis between the song to be identified and respective songs in a music library in terms of release information and auditory perception information; and Step 203: determining a song release date of the song to be identified according to a result of the comparative analysis.

As described for the foregoing scenarios, through the method provided in FIG. 6, song release dates required in respective scenarios can be determined, and more scenario requirements can be achieved based on the determined song release dates.

Exemplarily, the song release dates of the respective songs stored in the server 2 can be determined based on the method shown in FIG. 6, and then generation of a first page is performed based on the determined release dates of the respective songs. The first page may specifically be a first page shown in any one of the above three scenarios, or may be other page.

In the prior art, for a music platform, determination of a release date of a song is typically based on determination of a release date of an album to which the song belongs. When the music platform has collected therein a newly released album, the album release date of the album will be regarded as a release date of respective songs collected in the album. For example, an album release date of a certain album is Dec. 15, 2020, then the song release date of each of song a, song b and song c in the album is determined as Dec. 15, 2020.

At this point, if the music platform marks and pushes a song whose release date is later than Dec. 14, 2020 as a new song, the aforementioned songs a, b, and c are all identified as new songs, and corresponding pushes are performed.

However, as described in the previous background part, in many cases, classic oldies will be collected and released again. For example, the aforementioned song a has been collected in an album released on Dec. 1, 2010. This release is a re-release of song a. However, since song a is collected in the album whose release date is Dec. 15, 2020, the song a will still be marked and pushed as a new song, which results in that in a push page of new songs received by a user, newly released songs from oldies including song a are included, incurring poor listening experience for users.

The technical solutions provided in the present disclosure are just to solve this problem, so that a real song release date of a song can be identified and obtained by the music platform of the song, so that songs in the generated recommendation list of new song are all real new songs. Step 201 to Step 203 records a method for determining a release date of a song provided in the present disclosure.

Different from the prior art, in the song recommendation method provided in the present disclosure, "duplicate checking" will be performed with song information of a song to be identified and existing songs in a music library to determine whether the song is a re-released song.

In embodiments of the present disclosure, after a music platform has collected therein a certain newly released album, the music platform may select any one of songs as the song to be identified, so that a recommendation apparatus can perform song release date identification for the song.

Specifically, the recommendation apparatus can firstly obtain song information of the song to be identified, and the song information can specifically include release information and auditory perception information.

The release information can specifically originate from album collection information uploaded by an issuer or a copyright owner of an album, and international standard recording code (International Standard Recording Code, ISRC for short) of an album. The release information may include one or more of the following: song name information, artist information, song summary information, and song identifier information.

The auditory perception information can be expressed as audio-visual experience of a user when the user hears a song. The auditory perception information is typically associated with an audio feature, and/or a voiceprint feature of a song, and varies with arrangement of the song, a singer's own voice and singing techniques.

The recommendation apparatus can perform comparative analysis between the song to be identified and respective songs in an existing music library in terms of release information and auditory perception information, and determine a song release date of the song to be identified.

If there is no candidate song, in the music library, whose song information is the same as song information of the song to be identified, an album release date in the release information of the song to be identified is taken as the song release date of the song to be identified.

For example, taking song b as an example, an album release date of the album A to which the song b belongs is Dec. 15, 2020. It can be seen via comparative analysis for the release information and the auditory perception information that, in the existing music library, there is no such song whose release information and auditory perception information are the same as those of song b. At this point, the album release date "Dec. 15, 2020" of the song b can be regarded as the song release date of the song b directly, and recorded in a corresponding field of song information of the song b (e.g., recorded in such a field, that is, the song release date of the song information).

If there is a candidate song, in the music library, whose song information is the same as song information of the song to be identified, an album release date with a largest time interval from a current date is selected, from an album release date in release information of the respective candidate song, as the song release date of the song to be identified.

For example, taking the song a as an example, an album release date of the album A to which the song a belongs is Dec. 15, 2020. It can be seen via comparative analysis for release information and auditory perception information that, in the existing music library, there are candidate songs a1 and a2 whose release information and auditory perception information are the same as those of the song a.

At that point, an album release date of an album A1 to which the candidate song a1 belongs is "Dec. 1, 2010", and an album release date of an album A2 to which the candidate song a2 belongs is "Dec. 1, 2015". Since the release date of album A1 is earlier, at this point, "Dec. 1, 2010" can be regarded as a real song release date of the song a and recorded in a corresponding field in song information of the song a (e.g. recorded in such a field, that is, the song release date of the song information).

It should be noted that the aforementioned album A, album A1, and album A2 may have the same issuer, copyright owner, issuance way and issuance platform, or may have different issuers, copyright owners, issuance ways and issuance platforms, which will not be limited here.

Determination of a real song release date for a song can be achieved through the above method, thereby facilitating identification and recommendation for a new song subsequently.

In order to improve identification efficiency and identification speed for a song release date, in an optional implementation, a processing manner such as distributed identification can be adopted:

where Step 202 may specifically include:

Step 2021, performing, based on the release information, similar-song division for the song to be identified and the respective songs in the music library to obtain similar songs similar to the song to be identified.

Step 2022, performing, based on the auditory perception information, clustering for the song to be identified and the respective similar songs to obtain a candidate song.

Specifically, for songs, by means of analyzing their release information, songs that are similar to the song to be identified can be filtered out to obtain candidate song(s). The candidate song(s) includes/include but is/are not limited to: a song/songs with the same release information as the release information of the song to be identified (e.g., a same song which a same artist sings at different concerts, and a same song which a same artist sings in partnership with different artists and etc.), and the candidate song(s) can also include a song with the same release information as that of the song to be identified (e.g., cover songs of the same song by different artists and the like).

For example, for the song c, by means of analyzing release information, it can be identified that the music library includes a song c1 (a cover song), a song c2 (a concert version), and a song c3 (an earliest released song). At this point, the song c1, the song c2, and the song c3 may be taken as candidate songs similar to song c.

Subsequently, the recommendation apparatus also performs clustering based on auditory perception information for respective candidate songs to determine a candidate song that is exactly the same as the song to be identified.

Specifically, as mentioned above, the auditory perception information can be expressed as audio-visual experience of a user when the user hears a song, and the auditory perception information is typically associated with an audio feature, and/or a voiceprint feature of the song, and varies with arrangement of the song, a singer's own voice and singing techniques.

When the recommendation apparatus performs the clustering, it can perform comparison between the song to be identified and the respective similar songs in terms of an audio feature and/or a voiceprint feature to select, from the respective similar songs, a candidate song whose audio feature and/or voiceprint feature are the same as those of the song to be identified.

The audio feature refers to characteristics of a song on frequency, amplitude, and phase. A processing apparatus can obtain characteristics of a song on frequency, amplitude, and phase by means of analyzing the audio feature of the song, and then cluster out songs with the same frequency, amplitude, and phase for a candidate song consideration.

The voiceprint feature refers to characteristics obtained upon conversion of sound signals of a song into electrical signals. By means of performing signal conversion and feature analysis for a song, acoustic spectrum of verbal information carried in the song can be analyzed, thereby realizing clustering identification of songs to obtain the candidate song.

Alternatively, the aforementioned audio feature and voiceprint feature can also be combined during clustering to realize clustering analysis for songs so that a candidate song which is the same as the song to be identified is identified from candidate songs of the song to be identified.

In implementations provided in embodiments of the present disclosure, due to a large number of songs in the music library, direct use of auditory perception information to perform identification of a candidate song will easily render longer identification time and higher identification costs, and direct use of release information to perform identification is prone to a case of limited identification accuracy and false identification. Therefore, in this implementation, by means of firstly using release information to perform identification of similar candidate songs, and then using auditory perception information to cluster from the candidate songs a candidate song which is the same as the song to be identified, thereby identification efficiency is improved while ensuring the identification accuracy.

In an optional embodiment, the identification method further includes: marking, from the respective songs in the music library, a song whose song release date is earlier than a preset date as a new song, where the target song is selected from songs marked as new songs.

Referring to the aforementioned scenario diagrams, in generating a recommendation page of new songs, firstly a preset date can be determined as a filter condition, then by means of reading such a field, i.e. a song release date in song information of a song, a real release date of the song is obtained, and whether the song is a new song is marked and filtered based on the real release date. Several songs whose real song release dates are later than the preset date are obtained via filtering, and these songs constitute a recommendation page of new songs to be pushed to users.

In the song recommendation method provided in the embodiments of the present disclosure, song information of a song to be identified is obtained firstly, where the song information includes release information and auditory perception information of the song to be identified; then comparative analysis is performed between the song to be identified and respective songs in a music library in terms of song information; finally, a song release date of the song to be identified is determined according to a result of the comparative analysis. In this way, a real song release date of a song can be effectively identified, avoiding occurrence of a case where an "oldie" in a newly released album is identified as a "new song", which effectively improves identification accuracy of a new song, and is convenient for users to use.

Figure 7:
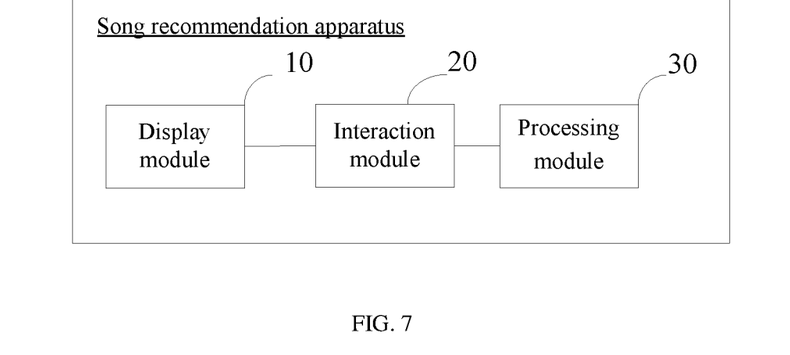
FIG. 7 is a structural block diagram of a song recommendation apparatus according to an embodiment of the present disclosure.

Corresponding to the song recommendation method of the above embodiment, FIG. 7 is a structural block diagram of a song recommendation apparatus according to an embodiment of the present disclosure. For ease of explanation, only parts related to the embodiments of the present disclosure are shown. Referring to FIG. 7, the song recommendation apparatus includes:

a display module 10, configured to display a first page, where the first page includes a target song selected according to a song release date;

an interaction module 20, configured to respond to a selection operation performed for the target song on the first page, so that the display module switches the first page to a second page of the selected target song;

where the song release date of the target song is determined according to song release information and auditory perception information of a song.

Optionally, the song recommendation apparatus also includes: a processing module 30.

The processing module 30 is configured to: obtain release information and auditory perception information of a song to be identified; perform comparative analysis between the song to be identified and respective songs in a music library in terms of release information and auditory perception information; and determine a song release date of the song to be identified according to a result of the comparative analysis.

Optionally, the processing module 30 is further configured to: if there is no candidate song, in the music library, whose song information is the same as song information of the song to be identified, take an album release date in the release information of the song to be identified as the song release date of the song to be identified.

Optionally, the processing module 30 is further configured to: if there is a candidate song, in the music library, whose song information is the same as song information of the song to be identified, select, from an album release date in release information of the respective candidate song, an album release date with a largest time interval from a current date as the song release date of the song to be identified.

Optionally, the processing module 30 is further configured to: perform, based on the release information, similar-song division for the song to be identified and the respective songs in the music library to obtain similar songs similar to the song to be identified; and perform, based on the auditory perception information, clustering for the song to be identified and the respective similar songs to obtain a candidate song.

The performing, based on the auditory perception information, the clustering for the song to be identified and the respective similar songs to obtain the candidate song, including: performing comparison between the song to be identified and the respective similar songs in terms of an audio feature and/or a voiceprint feature to select, from the respective similar songs, a candidate song whose audio feature and/or voiceprint feature are the same as those of the song to be identified.

Optionally, the release information includes one or more of the following: song title information, artist information, song summary information, and song identifier information.

Optionally, the processing module 30 is further configured to: mark, from the respective songs in the music library, a song whose song release date is earlier than a preset date as a new song, where the target song is selected from songs marked as new songs.

The song recommendation apparatus provided in the embodiments of the present disclosure can display a first page firstly, where the first page includes a target song selected according to a song release date, and then in response to a trigger operation performed for the target song on the first page, switch the first page to a second page of the selected target song. The song release date of the target song in this embodiment is determined according to song release information and auditory perception information of a song, and in this way, a real song release date of a song can be effectively identified, which in turn enables the target song shown on the first page to be selected based on the real song release date thereof. The identification accuracy of a new song can be improved effectively in the way, which is convenient for users to use.

An electronic device provided in this embodiment can be used to implement the technical solutions of the foregoing method embodiments; and implementation principles and technical effects therebetween are similar, which will not be repeated here in this embodiment.

Figure 8:
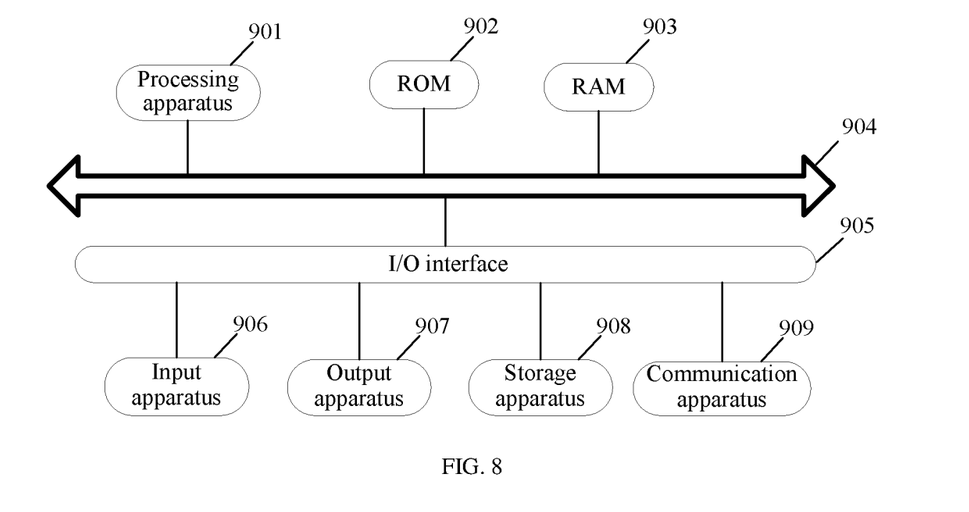
FIG. 8 is a schematic diagram of a hardware structure of an electronic device according to an embodiment of the present disclosure.

Referring to FIG. 8, it shows a schematic structural diagram of an electronic device 900 suitable for implementing embodiments of the present disclosure. The electronic device 900 may be a terminal device or a media library. The terminal device may include, but is not limited to a mobile terminal such as a mobile phone, a laptop, a digital broadcast receiver, a personal digital assistant (Personal Digital Assistant, PDA for short), a tablet (Portable Android Device, PAD for short), a portable multimedia player (Portable Media Player, PMP for short), a vehicle-mounted terminal (e.g., a vehicle-mounted navigation terminal) or the like, and a fixed terminal such as a digital TV, a desktop computer or the like. The electronic device shown in FIG. 8 is merely an example, and should not impose any restrictions on the function and the range of use of the embodiments of the present disclosure.

As shown in FIG. 8, the electronic device 900 may include a processing apparatus (such as a central processor, a graphics processor and etc.) 901, which may perform various appropriate actions and processing according to a program stored in a read only memory (Read Only Memory, ROM) 902 or a program loaded from a storage apparatus 908 to a random access memory (Random Access Memory, RAM) 903. In the RAM 903, various programs and data required for the operation of the electronic device 900 are also stored. The processing apparatus 901, the ROM 902, and the RAM 903 are connected with each other through a bus 904. An input/output (Input/Output, I/O) interface 905 is also connected to the bus 904.

Generally, the following apparatuses may be connected to the I/O interface 905: an input apparatus 906, including, for example, a touch screen, a touch panel, a keyboard, a mouse, a camera, a microphone, an accelerometer, a gyroscope, and the like; an output apparatus 907, including for example a liquid crystal display (Liquid Crystal Display, LCD for short), a speaker, a vibrator, and the like; a storage apparatus 908, including for example a magnetic tape, a hard disk, and the like; and a communication apparatus 909. The communication apparatus 909 may allow the electronic device 900 to perform wireless or wired communication with other devices to exchange data. Although FIG. 8 shows the electronic device 900 with multiple kinds of apparatuses, it should be understood that it is not required to implement or have all the apparatuses shown. It may alternatively be implemented or provided with more or fewer apparatuses.

In particular, according to embodiments of the present disclosure, the process described above with reference to the flowchart may be implemented as a computer software program. For example, an embodiment of the present disclosure includes a computer program product, which includes a computer program carried on a computer readable medium. The computer program contains program codes for executing the method shown in the flowcharts. In such an embodiment, the computer program may be downloaded from a network and installed through the communication apparatus 909, or installed from the storage apparatus 908, or installed from the ROM 902. When the computer program is executed by the processing apparatus 901, the above-mentioned functions defined in methods of embodiments of the present disclosure are executed.

It should be noted that, the above-mentioned computer readable medium in the present disclosure may be a computer readable signal medium or a computer readable storage medium or any combination of the both. The computer readable storage medium may be, for example, but not limited to, an electrical, magnetic, optical, electromagnetic, infrared, or semiconductor system, apparatus or device, or any combination of the above. A more specific example of the computer readable storage medium may include, but is not limited to: an electrically connected portable computer disk with one or more wires, a hard disk, a random access memory (RAM), a read only memory (ROM), an erasable programmable read only memory (Electrically Programmable Read Only Memory, EPROM), a flash, an optical fiber, a portable compact disc read only memory (Compact Disc-Read Only Memory, CD-ROM), an optical storage device, a magnetic storage device, or any suitable combination of the above. In the present disclosure, the computer readable storage medium may be any tangible medium that contains or stores a program, and the program may be used by or in combination with an instruction execution system, apparatus, or device. In the present disclosure, a computer readable signal medium may include a data signal propagated in a baseband or propagated as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable medium other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, RF (Radio Frequency), etc., or any suitable combination of the above.

The above-mentioned computer readable medium may be included in the above-mentioned electronic device; or it may exist alone without being assembled into the electronic device.

The above-mentioned computer readable medium carries thereon one or more programs which, when executed by the electronic device, enable the electronic device to execute the methods shown in the above-mentioned embodiments.

Computer program codes used to perform operations of the present disclosure may be written in one or more programming languages or a combination thereof. The above-mentioned programming languages include an object-oriented programming language, such as Java, Smalltalk, C++, and also include a conventional procedural programming language, such as "C" language or similar programming language. Program codes may be executed entirely on a computer of a user, partly on a computer of a user, executed as an independent software package, partly executed on a computer of a user and partly executed on a remote computer, or entirely executed on a remote computer or a media library. In a case where a remote computer is involved, the remote computer may be connected to the computer of the user through any kind of network including a local area network (Local Area Network, LAN for short) or a wide area network (Wide Area Network, WAN for short), or, may be connected to an external computer (for example, connected via the Internet utilizing an Internet service provider).

An embodiment of the present disclosure provides a computer program product, including computer instructions which, when executed by a processor, implement the song recommendation method as described in any one of above; and implementation principles and technical effects therebetween are similar, which will not be repeated here in this embodiment.

An embodiment of the present disclosure also provides a computer program which, when executed by a processor, implements the song recommendation method as described in any one of above.

The flowcharts and block diagrams in the accompanying drawings illustrate architecture, functions, and operations of possible implementations of the system, method, and computer program product in accordance with various embodiments of the present disclosure. In this point, each block in the flowcharts or block diagrams may represent a module, a program segment, or a part of codes, and the module, the program segment, or the part of codes contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagrams and/or flowcharts, and a combination of blocks in the block diagrams and/or flowcharts, may be implemented by a dedicated hardware-based system that performs designated functions or operations, or may be implemented by a combination of dedicated hardware and computer instructions.

The units involved in the embodiments of the present disclosure may be implemented in software or hardware. Where a name of a unit does not constitute a limitation on the unit itself in a certain case. For example, a first acquisition unit may also be described as "a unit that acquires at least two Internet Protocol addresses".

The functions described above herein may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), and the like.

The following describes some embodiments of the present disclosure.

In a first aspect, according to one or more embodiments of the present disclosure, a song recommendation method, including:

displaying a first page, where the first page includes a target song selected according to a song release date; and in response to a selection operation performed for the target song on the first page, switching the first page to a second page of the selected target song;

where the song release date of the target song is determined according to song release information and auditory perception information of a song.

In an optional embodiment, before the displaying the first page, the method further includes:

obtaining release information and auditory perception information of a song to be identified;

performing comparative analysis between the song to be identified and respective songs in a music library in terms of release information and auditory perception information; and determining a song release date of the song to be identified according to a result of the comparative analysis.

In an optional embodiment, the determining the song release date of the song to be identified according to the result of the comparison includes:

if there is no candidate song, in the music library, whose song information is the same as song information of the song to be identified, taking an album release date in the release information of the song to be identified as the song release date of the song to be identified.

In an optional embodiment, the determining the song release date of the song to be identified according to the result of the comparative analysis includes:

if there is a candidate song, in the music library, whose song information is the same as song information of the song to be identified, selecting, from an album release date in release information of the respective candidate song, an album release date with a largest time interval from a current date, as the song release date of the song to be identified.

In an optional embodiment, the performing the comparative analysis between the song to be identified and the respective songs in the music library in terms of song information includes:

performing, based on the release information, similar-song division for the song to be identified and the respective songs in the music library, to obtain similar songs similar to the song to be identified; and performing, based on the auditory perception information, clustering for the song to be identified and the respective similar songs to obtain a candidate song.

In an optional embodiment, the performing, based on the auditory perception information, the clustering for the song to be identified and the respective similar songs to obtain the candidate song includes:

performing comparison between the song to be identified and the respective similar songs in terms of an audio feature and/or a voiceprint feature to select, from the respective similar songs, a candidate song whose audio feature and/or voiceprint feature are the same as those of the song to be identified.

In an optional embodiment, the release information includes one or more of the following: song name information, artist information, song summary information, and song identifier information.

In an optional embodiment, the method further includes:

marking, from the respective songs in the music library, a song whose song release date is earlier than a preset date as a new song, where the target song is selected from songs marked as new songs.

In a second aspect, according to one or more embodiments of the present disclosure, a song recommendation apparatus includes:

a display module, configured to display a first page, where the first page includes a target song selected according to a song release date; and an interaction module, configured to switch, in response to a selection operation performed for the target song on the first page, the first page to a second page of the selected target song;

where the song release date of the target song is determined according to song release information and auditory perception information of a song.

Optionally, the apparatus also includes a processing module;

where the processing module is configured to: obtain release information and auditory perception information of a song to be identified; perform comparative analysis between the song to be identified and respective songs in a music library in terms of release information and auditory perception information; and determine a song release date of the song to be identified according to a result of the comparative analysis.

Optionally, the processing module is further configured to: if there is no candidate song, in the music library, whose song information is the same as song information of the song to be identified, take an album release date in the release information of the song to be identified as the song release date of the song to be identified.

Optionally, the processing module is further configured to: if there is a candidate song, in the music library, whose song information is the same as song information of the song to be identified, select, from an album release date in release information of the respective candidate song, an album release date with a largest time interval from a current date, as the song release date of the song to be identified.

Optionally, the processing module is further configured to: perform, based on the release information, similar-song division for the song to be identified and the respective songs in the music library, to obtain similar songs similar to the song to be identified; and perform, based on the auditory perception information, clustering for the song to be identified and the respective similar songs to obtain a candidate song.

The performing, based on the auditory perception information, the clustering for the song to be identified and the respective similar songs to obtain the candidate song includes:

performing comparison between the song to be identified and the respective similar songs in terms of an audio feature and/or a voiceprint feature to select, from the respective similar songs, a candidate song whose audio feature and/or voiceprint feature are the same as those of the song to be identified.

Optionally, the release information includes one or more of the following: song name information, artist information, song summary information, and song identifier information.

Optionally, the processing module is further configured to: mark, from the respective songs in the music library, a song whose song release date is earlier than a preset date as a new song, where the target song is selected from songs marked as new songs.

In a third aspect, according to one or more embodiments of the present disclosure, an electronic device includes: at least one processor and a memory;

where the memory stores computer execution instructions;

the at least one processor executes the computer execution instructions stored in the memory to enable the at least one processor to execute the song recommendation method according to any one of the above.

In a fourth aspect, according to one or more embodiments of the present disclosure, a computer readable storage medium having, stored therein, computer execution instructions which, when executed by a processor, implement the song recommendation method according to any one of the above.

In a fifth aspect, according to one or more embodiments of the present disclosure, a computer program product includes computer instructions which, when executed by a processor, implement the song recommendation method according to any one of the above.

In a six aspect, according to one or more embodiments of the present disclosure, a computer program which, when executed by a processor, implements the song recommendation method according to any one of above.

The above description is merely intended for preferred embodiments of the present disclosure and an illustration of the applied technical principles. Those skilled in the art should understand that, the disclosure scope involved in the present disclosure is not limited to the technical solutions formed by a specific combination of the above technical features, but also should cover other technical solutions formed by an arbitrary combination of the above technical features or their equivalent features without departing from the above disclosure concept, for example, a technical solution formed by a replacement of the above features with technical features with similar functions disclosed (but not limited to) in the present disclosure.

In addition, although respective operations are described in a specific order, this should not be interpreted as requiring these operations to be performed in the specific order shown or in a sequential order. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable subcombination.

Although the subject matter has been described in language specific to structural features and/or method logical actions, it should be understood that the subject matter defined in the appended claims is not limited to the specific features or actions described above. On the contrary, the specific features and actions described above are only exemplary forms for implementing the claims.

What is claimed is:

1. A song recommendation method, wherein the method is executed by a server, the method comprising:
    displaying, by the server through an application interface or a control display interface of a client application, a first page, wherein the first page comprises a target song selected according to a song release date, and pushed by the server to the client application, wherein the server is configured to provide a file or data of the target song to the client application; and
    in response to a trigger operation performed for the target song on the first page, switching, by the server through the application interface or the control display interface of the client application, the first page to a second page of the selected target song;
    wherein the song release date of the target song is determined by the server according to release information and auditory perception information of a song.

2. The song recommendation method according to claim 1, wherein before the displaying the first page, the method further comprises:
    obtaining release information and auditory perception information of a song to be identified;
    performing comparative analysis between the song to be identified and respective songs in a music library in terms of release information and auditory perception information; and
    determining a song release date of the song to be identified according to a result of the comparative analysis.

3. The song recommendation method according to claim 2, wherein the determining the song release date of the song to be identified according to the result of the comparative analysis comprises:
    if there is no candidate song, in the music library, whose song information is the same as song information of the song to be identified, taking an album release date in the release information of the song to be identified as the song release date of the song to be identified.

4. The song recommendation method according to claim 2, wherein the determining the song release date of the song to be identified according to the result of the comparative analysis comprises:
    if there is a candidate song, in the music library, whose song information is the same as song information of the song to be identified, selecting, from an album release date in release information of the respective candidate song, an album release date with a largest time interval from a current date, as the song release date of the song to be identified.

5. The song recommendation method according to claim 2, wherein the performing the comparative analysis between the song to be identified and the respective songs in the music library in terms of song information comprises:
    performing, based on the release information of the song to be identified and the release information of the respective songs in the music library, similar-song division for the song to be identified and the respective songs in the music library, to obtain similar songs similar to the song to be identified; and
    performing, based on the auditory perception information of the song to be identified and the auditory perception information of the respective songs in the music library, clustering for the song to be identified and the respective similar songs to obtain a candidate song.

6. The song recommendation method according to claim 5, wherein the performing, based on the auditory perception information of the song to be identified and the auditory perception information of the respective songs in the music library, the clustering for the song to be identified and the respective similar songs to obtain the candidate song comprises:
    performing comparison between the song to be identified and the respective similar songs in terms of an audio feature and/or a voiceprint feature to select, from the respective similar songs, a candidate song whose audio feature and/or voiceprint feature are the same as those of the song to be identified.

7. The song recommendation method according to claim 1, wherein the release information comprises one or more of the following: song name information, artist information, song summary information, and song identifier information.

8. The song recommendation method according to claim 1, further comprising:
    marking, from the respective songs in the music library, a song whose song release date is later than a preset date as a new song,
    wherein the target song is selected from songs marked as new songs.

9. A song recommendation apparatus, comprising:
    at least one processor; and
    a memory;
    wherein the memory stores computer execution instructions; and
    the processor is configured to call and run the computer execution instructions stored in the memory to:

display a first page, wherein the first page comprises a target song selected according to a song release date; and switch, in response to a trigger operation performed for the target song on the first page, the first page to a second page of the selected target song;

wherein the song release date of the target song is determined according to release information and auditory perception information of a song.

10. The song recommendation apparatus according to claim 9, wherein the processor is further configured to:

obtain release information and auditory perception information of a song to be identified;

perform comparative analysis between the song to be identified and respective songs in a music library in terms of release information and auditory perception information; and determine a song release date of the song to be identified according to a result of the comparative analysis.

11. The song recommendation apparatus according to claim 10, wherein the processor is further configured to:

if there is no candidate song, in the music library, whose song information is the same as song information of the song to be identified, take an album release date in the release information of the song to be identified as the song release date of the song to be identified.

12. The song recommendation apparatus according to claim 10, wherein the processor is further configured to:

if there is a candidate song, in the music library, whose song information is the same as song information of the song to be identified, select, from an album release date in release information of the respective candidate song, an album release date with a largest time interval from a current date, as the song release date of the song to be identified.

13. The song recommendation apparatus according to claim 10, wherein the processor is further configured to:

perform, based on the release information of the song to be identified and the release information of the respective songs in the music library, similar-song division for the song to be identified and the respective songs in the music library, to obtain similar songs similar to the song to be identified; and perform, based on the auditory perception information of the song to be identified and the auditory perception information of the respective songs in the music library, clustering for the song to be identified and the respective similar songs to obtain a candidate song.

14. The song recommendation apparatus according to claim 13, wherein the performing, based on the auditory perception information of the song to be identified and the auditory perception information of the respective songs in the music library, the clustering for the song to be identified and the respective similar songs to obtain the candidate song comprises:

performing comparison between the song to be identified and the respective similar songs in terms of an audio feature and/or a voiceprint feature to select, from the respective similar songs, a candidate song whose audio feature and/or voiceprint feature are the same as those of the song to be identified.

15. The song recommendation apparatus according to claim 9, wherein the release information comprises one or more of the following: song name information, artist information, song summary information, and song identifier information.

16. The song recommendation apparatus according to claim 9, wherein the processor is further configured to:

mark, from the respective songs in the music library, a song whose song release date is later than a preset date as a new song, wherein the target song is selected from songs marked as new songs.

17. A non-transitory computer readable storage medium having, stored therein, computer execution instructions which, when executed by a processor, cause the processor to:

display a first page, wherein the first page comprises a target song selected according to a song release date; and in response to a trigger operation performed for the target song on the first page, switch the first page to a second page of the selected target song;

wherein the song release date of the target song is determined according to release information and auditory perception information of a song.

18. The non-transitory computer readable storage medium according to claim 17, wherein the computer execution instructions are further used to cause the processor to:

obtain release information and auditory perception information of a song to be identified;

perform comparative analysis between the song to be identified and respective songs in a music library in terms of release information and auditory perception information; and determine a song release date of the song to be identified according to a result of the comparative analysis.

19. The non-transitory computer readable storage medium according to claim 18, wherein the computer execution instructions are further used to cause the processor to:

if there is no candidate song, in the music library, whose song information is the same as song information of the song to be identified, take an album release date in the release information of the song to be identified as the song release date of the song to be identified.

20. The non-transitory computer readable storage medium according to claim 18, wherein the computer execution instructions are further used to cause the processor to:

if there is a candidate song, in the music library, whose song information is the same as song information of the song to be identified, selecting, from an album release date in release information of the respective candidate song, an album release date with a largest time interval from a current date, as the song release date of the song to be identified.

* * * * *